(12) United States Patent
Tanno et al.

(10) Patent No.: US 11,108,053 B2
(45) Date of Patent: Aug. 31, 2021

(54) RESIN COMPOSITION FOR DENSE FUEL CELL SEPARATORS

(71) Applicant: Nisshinbo Chemical Inc., Tokyo (JP)

(72) Inventors: Fumio Tanno, Chiba (JP); Yasuhito Nakagawa, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 329 days.

(21) Appl. No.: 16/340,479

(22) PCT Filed: Sep. 21, 2017

(86) PCT No.: PCT/JP2017/034032
§ 371 (c)(1),
(2) Date: Apr. 9, 2019

(87) PCT Pub. No.: WO2018/070205
PCT Pub. Date: Apr. 19, 2018

(65) Prior Publication Data
US 2019/0245218 A1 Aug. 8, 2019

(30) Foreign Application Priority Data

Oct. 14, 2016 (JP) .............................. JP2016-202598

(51) Int. Cl.
*H01M 8/0226* (2016.01)
*H01M 8/0213* (2016.01)
(Continued)

(52) U.S. Cl.
CPC ............. *H01M 8/0226* (2013.01); *C08K 3/04* (2013.01); *C08K 5/3445* (2013.01); *C08L 61/06* (2013.01);
(Continued)

(58) Field of Classification Search
CPC ............ H01M 8/0226; H01M 8/0213; H01M 8/0221; H01M 8/10; C08L 63/04;
(Continued)

(56) References Cited

U.S. PATENT DOCUMENTS

2009/0267250 A1 10/2009 Inada et al.

FOREIGN PATENT DOCUMENTS

JP 2003-297382 A 10/2003
JP 2013-20819 A 1/2013
(Continued)

OTHER PUBLICATIONS

Machine translation of JP 2014-164802, Kobayashi et al., 2014 (Year: 2014).*

(Continued)

*Primary Examiner* — Kwang Han
(74) *Attorney, Agent, or Firm* — Westerman, Hattori, Daniels & Adrian, LLP (57) ABSTRACT

The present invention is a resin composition for dense fuel cell separators, which contains a graphite powder and an epoxy resin component that contains a base material, a curing agent and a curing accelerator, and wherein: the graphite powder has a spring back of 20-70% and an average particle diameter d50 of 30-100 μm; and the curing accelerator is an imidazole compound that has an aryl group in the 2-position. This resin composition for dense fuel cell separators enables the achievement of a dense separator for fuel cells, which satisfies a predetermined performance even in cases where the separator is compression molded in a short time that is less than 10 seconds.

8 Claims, 2 Drawing Sheets

(51) Int. Cl.
  *H01M 8/0221* (2016.01)
  *H01M 8/10* (2016.01)
  *C08L 63/04* (2006.01)
  *C08K 5/3445* (2006.01)
  *C08K 3/04* (2006.01)
  *C08L 61/06* (2006.01)

(52) U.S. Cl.
  CPC ........... *C08L 63/04* (2013.01); *H01M 8/0213* (2013.01); *H01M 8/0221* (2013.01); *C08K 2201/005* (2013.01); *C08L 2203/20* (2013.01); *H01M 8/10* (2013.01); *Y02P 70/50* (2015.11)

(58) Field of Classification Search
  CPC ... C08L 61/06; C08L 2203/20; C08K 5/3445; C08K 3/04; C08K 2201/005; Y02P 70/50; Y02E 60/50
  See application file for complete search history.

(56) References Cited

FOREIGN PATENT DOCUMENTS

| | | | | |
|---|---|---|---|---|
| JP | 2014-164802 | * | 9/2014 | .............. H01M 8/02 |
| JP | 2014-185296 | * | 10/2014 | .............. C08G 59/40 |
| WO | 98/53514 A1 | | 11/1998 | |
| WO | 2007/043600 A1 | | 4/2007 | |
| WO | 2016/008951 A1 | | 1/2016 | |

OTHER PUBLICATIONS

Machine translation of JP 2014-185296, Otani et al., 2014 (Year: 2014).*

International Search Report dated Dec. 26, 2017, issued in counterpart International Application No. PCT/JP2017/034032 (2 pages).

* cited by examiner

RESIN COMPOSITION FOR DENSE FUEL CELL SEPARATORS

TECHNICAL FIELD

The present invention relates to a resin composition for dense fuel cell separators.

BACKGROUND ART

One role of the fuel cell separator is to confer each unit cell with electrical conductivity. In addition, separators provide flow channels for the supply of fuel and air (oxygen) to the unit cells and also serve as boundary walls separating the unit cells.

Properties required of a separator thus include a high electrical conductivity, a high impermeability to gases, chemical stability, heat resistance and hydrophilicity.

Of such fuel cell separators, carbon separators produced from separator compositions which include graphite powder and a resin component are generally formed by compression molding the composition under applied heat within a mold for a given length of time.

In recent years, improvements in the production efficiency of fuel cell separators have been sought in order to lower their cost, and there exists a desire for the length of time required in production steps, such as the compression molding time, to be shortened.

Art from this standpoint includes, for example, the disclosure in Patent Document 1 of a method for producing fuel cell separators that includes the step of compression molding, for 10 to 30 seconds in a mold, a molding material that includes an epoxy resin, a curing agent, a curing accelerator, and graphite particles in a ratio with respect to the total solids of from 70 to 80 wt %.

However, in the production method of Patent Document 1, at the 10 to 30 seconds employed as the compression molding time in the mold, the productivity improves, but because the holding time within the mold is short, curing of the resin composition is incomplete. In order to bring curing to completion, not only is heat treatment under pressing necessary as well, facilities for carrying out such heat treatment are also required. Hence, there remains room for improvement in terms of production efficiency.

Moreover, the fuel cell separators obtained by this production method have a total organic carbon (TOC) value (indicating leachability) of 15 ppm or more (see Example 1 in Patent Document 1), which adversely affects fuel cell performance.

PRIOR ART DOCUMENTS

Patent Documents

Patent Document 1: JP-A 2013-020819

SUMMARY OF INVENTION

Technical Problem

It is therefore an object of this invention to provide a resin composition for dense fuel cell separators which, even when compression molded for a short period of less than 10 seconds, is able to give dense fuel cell separators that satisfy a given level of performance.

Solution to Problem

The inventors have conducted extensive investigations in order to achieve this object.

As a result, they have discovered that, by using a composition which includes graphite powder having a specific springback and average particle size and an epoxy resin component that includes a specific curing accelerator, a dense fuel cell separator endowed with a good performance can be obtained even by compression molding for a short period of less than 10 seconds.

Accordingly, the invention provides:
1. A resin composition for dense fuel cell separators, comprising graphite powder and an epoxy resin component that includes a base resin, a curing agent and a curing accelerator, wherein the graphite powder has a springback of between 20 and 70% and an average particle size d50 of from 30 to 100 µm, and the curing accelerator is an imidazole compound having an aryl group at the 2 position.
2. The resin composition for dense fuel cell separators of 1 above, wherein the springback is between 20 and 65%.
3. The resin composition for dense fuel cell separators of 1 or 2 above, wherein the base resin is at least one resin selected from the group consisting of cresol-novolak epoxy resins and biphenyl epoxy resins.
4. The resin composition for dense fuel cell separators of any of 1 to 3 above, wherein the curing agent is a novolak phenolic resin.
5. The resin composition for dense fuel cell separators of any of 1 to 4 above, wherein the curing accelerator is an imidazole compound having a phenyl group at the 2 position.
6. A dense fuel cell separator which is obtained by molding the resin composition for dense fuel cell separators of any of 1 to 5 above.
7. The dense fuel cell separator of 6 above which has a resistivity of not more than 15 mΩ·cm, a glass transition temperature of at least 135° C. and a flexural strength of at least 50 MPa.
8. The dense fuel cell separators of 6 or 7 above which has a total organic carbon (TOC) value of 7 ppm or less.
9. A method for producing a dense fuel cell separator, comprising the step of compression molding the resin composition for dense fuel cell separators of any of 1 to 5 above.
10. The method for producing a dense fuel cell separator of 9 above, wherein compression molding is carried out for a period of less than 10 seconds.

Advantageous Effects of Invention

By using the resin composition for dense fuel cell separators of the invention, compression molding ends in a short time, increasing separator productivity.

Moreover, dense fuel cell separators obtained in a compression molding time of less than 10 seconds using resin compositions according to the invention have the following excellent properties: low resistivity, high glass transition point and low total organic carbon (TOC).

DESCRIPTION OF EMBODIMENTS

The invention is described more fully below.

The resin composition for dense fuel separators according to the invention is made up of graphite powder and an epoxy resin component that includes a base resin, a curing agent and a curing accelerator, and is characterized in that the graphite powder has a springback of between 20 and 70% and an average particle size d50 of from 30 to 100 and the curing accelerator is an imidazole compound having an aryl group at the 2 position.

In resin molding, assuming the composition to be the same, a higher molding temperature or a higher molding pressure generally results in a shorter compression molding time. However, when the molding temperature is increased too much, a rise in viscosity occurs and the flowability worsens due to rapid resin curing reactions within the mold. This sometimes makes it difficult to obtain a uniform, thin-walled separator or causes molding defects that lead to a high resistivity. On the other hand, in order to increase the molding pressure, a press having a corresponding power is required.

The inventors have found both that, by using a graphite powder having a low springback, effects similar to those obtained by increasing the molding temperature and molding pressure can be achieved, making it possible to shorten the compression molding time, and that when the springback is too low, the strength of the resulting separator weakens.

Based on these findings, a graphite powder having a springback for the powder as a whole of between 20 to 70% is used in this invention. By using graphite having a springback within this range, the compression molding time can be shortened and separators that are thin-walled and uniform can be obtained.

As used herein, "springback" refers to springback by the powder itself. Specifically, as described in detail in the subsequent examples, this is the value computed as $[(Y-X)/X] \times 100(\%)$, where X is the height of the powder when charged into a specific die and compressed under a specific pressure and Y is the height of the powder when the pressure is released.

The graphite powder of the invention is not particularly limited as to, for example, the type thereof, provided that the powder as a whole satisfies the above springback. Use may be made of either natural graphite or synthetic graphite.

The synthetic graphite used may be suitably selected from among ones that have hitherto been used in fuel cell separators. Examples include synthetic graphite obtained by firing needle coke and synthetic graphite obtained by firing vein coke.

Likewise, the natural graphite used may be suitably selected from among ones that have hitherto been used in fuel cell separators. Examples include natural vein graphite and natural flake graphite.

In either case, a graphite for which the springback of the graphite powder, as measured by the subsequently described technique, falls within the range specified in this invention should be suitably selected. These graphite powders may be used singly or two or more may be used in combination.

In this invention, so long as the springback of the overall graphite powder used can be adjusted to between 20% and 70%, graphite powder having a springback that does not satisfy the range of between 20% and 70% may be used together with graphite powder having the above-specified springback, and graphite powder having a springback of below 20% may be used in combination with graphite powder having a springback greater than 70%.

Examples of such graphite powders include natural graphite and synthetic graphite. These may be used singly, or two or more may be used in combination.

Moreover, in this invention, so long as the springback of the overall graphite (carbonaceous material) power used can be adjusted to between 20% and 70%, other carbonaceous materials such as graphite obtained by grinding electrodes to powder, coal pitch, petroleum pitch, coke, activated carbon, glassy carbon, acetylene black and ketjenblack may be added. These carbonaceous materials may be used singly, or two or more may be used in combination.

In the graphite powder of the invention, when graphite powder having a springback of between 20% and 70% and graphite powder or carbonaceous material that does not satisfy this condition are used, the content ratio therebetween is not particularly limited, so long as the springback of the graphite powder obtained by mixing both is between 20% and 70%. However, to do away with the trouble of having to adjust the springback, graphite powder with a springback of between 20% and 70% accounts for preferably more than 20 wt %, more preferably 50 wt % or more, and even more preferably 90 wt % or more, of all the graphite powder.

The graphite powder used in this invention has an average particle size (d=50) which, taking into account the balance between the resistivity and the strength of the resulting separator, is set to from 30 to 100 μm, and preferably from 50 to 100 μm.

The base resin within the epoxy resin component is not particularly limited, provided it has epoxy groups. Examples include o-cresol-novolak epoxy resins, phenol-novolak epoxy resins, bisphenol A epoxy resins, bisphenol F epoxy resins, biphenyl epoxy resins, biphenyl aralkyl epoxy resins, trisphenol epoxy resins, brominated epoxy resins, dicyclopentadiene epoxy resins and biphenyl-novolak epoxy resins. These may be used singly, or two or more may be used in combination. Of these, an o-cresol-novolak epoxy resin alone, a biphenyl epoxy resin alone, and mixtures thereof are preferred.

The epoxy equivalent weight of the epoxy resin used in this invention, although not particularly limited, is preferably from 180 to 209 g/eq.

The curing agent within the epoxy resin component is not particularly limited, provided it is a phenolic resin. Specific examples include novolak phenolic resins, cresol-novolak phenolic resins, resol phenolic resins, alkyl-modified phenolic resins, biphenyl-novolak phenolic resins and tris(phenol methane) phenolic resins. These may be used singly, or two or more may be used in combination. Of these, novolak phenolic resins are preferred.

The hydroxyl equivalent weight of the phenolic resin used in the invention, although not particularly limited, is preferably from 95 to 240 g/eq, and more preferably from 100 to 115 g/eq.

An imidazole compound having an aryl group at the 2 position is used as the curing accelerator within the epoxy resin component.

Specific examples of the aryl group include phenyl, tolyl and naphthyl groups. A phenyl group is preferred.

Specific examples of imidazole compounds having an aryl group at the 2 position include 2-phenylimidazole and 2-phenyl-4-methylimidazole.

When an imidazole compound having a short-chain alkyl group such as 2-methylimidazole is used as the curing accelerator, the curing time is too rapid, making uniform molding impossible. On the other hand, when an imidazole compound having a long-chain alkyl group such as 2-undecylimidazole is used as the curing accelerator, the curing time is too slow, and so curing is not completed in a short time.

The amount of curing accelerator used is not particularly limited, although it may be set to from about 0.1 to about 5 parts by weight, preferably from 0.5 to 2 parts by weight, per 100 parts by weight of the mixture of the epoxy resin and the phenolic resin.

The content of the epoxy resin component (base resin, curing agent and curing accelerator) in the resin composition of the invention may be set to from about 10.0 to about 50.0 parts by weight per 100 parts by weight of the graphite powder, and is preferably from 20 to 40 parts by weight.

In this case, it is preferable to include from 0.98 to 1.08 equivalents of the phenolic resin with respect to the epoxy resin, and more preferable to include from 0.99 to 1.05 equivalents.

The resin composition of the invention may also include an internal mold release agent. The internal mold release agent may be suitably selected from among various types of internal mold release agents hitherto used in the molding of separators. Specific examples include stearic acid wax, amide wax, montanic acid wax, carnauba wax and polyethylene wax. These may be used singly, or two or more may be used in combination.

When an internal mold release agent is used, the content thereof, although not particularly limited, is typically from 0.1 to 1.5 parts by weight, and especially from 0.05 to 1.0 part by weight, per 100 parts by weight of the graphite powder.

The resin composition of the invention may be prepared by, for example, mixing the graphite powder, epoxy resin, phenolic resin and curing accelerator in any order and in the prescribed proportions. Illustrative examples of mixers that may be used for such mixing include planetary mixers, ribbon blenders, Loedige mixers, Henschel mixers, rocking mixers and Nauta mixers.

In cases where an internal mold release agent is used, it too may be added in any order.

The dense fuel cell separator of the invention can be obtained by charging the above composition into a given mold and compression molding. The mold used is exemplified by a mold for fuel cell separator production that is capable of forming, on one or both sides of the molded body, grooves to serve as gas flow channels.

The compression molding conditions, although not particularly limited, are typically a mold temperature of between 150 and 190° C. and a molding pressure of between 30 and 60 MPa, preferably between 30 and 50 MPa.

As mentioned above, by using the resin composition of the invention, a separator having properties suitable for practical use can be obtained in a short compression molding time of less than 10 seconds, enabling the production efficiency of separators to be increased.

The lower limit of the compression molding time may be suitably set according to the desired performance. However, to obtain separators having, for example, a practical resistivity and strength, the compression molding time is set to preferably at least 3 seconds, more preferably at least 5 seconds, and even more preferably at least 7 seconds. The upper limit in the compression molding time is not particularly limited, and may be set to a compression molding time of about one hour as in the prior art. However, because the performance does not improve to any great degree when the compression molding time is thus increased, from a practical standpoint, the upper limit in the compression molding time is preferably about 60 seconds, and more preferably about 30 seconds.

After compression molding, heating at between 150 and 200° C. for a period of between about 1 minute and about 600 minutes may be carried out to promote thermosetting. However, with the resin composition of this invention, separators having a performance that is adequate for practical purposes can be obtained even when this step is omitted.

In this invention, the dense fuel cell separator obtained by compression molding may be subjected to surface roughening treatment in order to remove the skin layer and adjust the surface roughness.

The surface roughening technique is not particularly limited and may be suitably selected from among various known surface roughening methods, such as blasting and polishing. Air blasting, wet blasting, barrel polishing and brush polishing are preferred, blasting treatment using an abrasive is more preferred, and wet blasting is even more preferred.

The abrasive used in blasting at this time has an average particle size (d=50) of preferably from 3 to 30 more preferably from 4 to 25 and even more preferably from 5 to 20 The material making up the abrasive used in blasting may be, for example, alumina, silicon carbide, zirconia, glass, nylon or stainless steel. These may be used singly, or two or more may be used in combination.

The discharge pressure during wet blasting varies according to, for example, the particle size of the abrasive, and therefore cannot be strictly specified. However, the discharge pressure is preferably between 0.1 and 1 MPa, and more preferably between 0.15 and 0.5 MPa.

The dense fuel cell separator obtained using the resin composition of the invention has the following characteristics: a resistivity of not more than 15 mΩ·cm, a glass transition point of at least 135° C., and a flexural strength of at least 50 MPa.

Another characteristic of the dense fuel cell separator is a total organic carbon (TOC) value, which indicates leachability, of 7 ppm or less.

Fuel cells equipped with the dense fuel cell separator of the invention having such characteristics are able to maintain a stable power generation efficiency over a long period of time.

A solid polymer fuel cell is generally composed of a stack of many unit cells, each of which is constructed of a solid polymer membrane disposed between a pair of electrodes that are in turn sandwiched between a pair of separators which form flow channels for the supply and removal of gases. The dense fuel cell separator of the invention may be used as some or all of the plurality of separators in the fuel cell.

EXAMPLES

Working Examples and Comparative Examples are given below by way of illustration, although the invention is not limited by these Examples. The characteristics in the Examples were measured by the following methods. All measured values are indicated as the average of three measurements.

[1] Springback of Graphite Powder

Figure 1A:
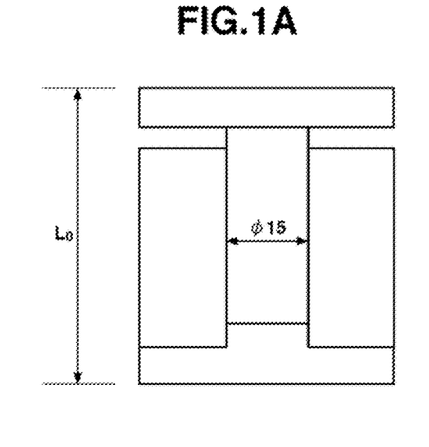
FIGS. 1A-1B show schematic side views of a die that may be used to measure the springback of graphite powder.
Figure 1B:
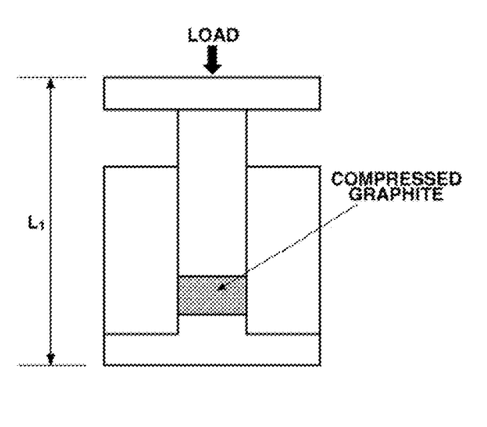

Two grams of graphite powder as the measurement sample was placed in the die having an inner diameter of 15 mm shown in FIG. 1A and the top surface of the sample was flattened, following which the powder was compressed by using a press to apply a 5.4-ton load to the punch over a period of 5 seconds (see FIG. 1B). The compressed state was held for 30 seconds, after which the load was quickly released. The height at the top of the punch was measured in each state with a height gauge and the springback was determined using the following formula.

$L_0$: Height of punch when die contains no sample (mm)
$L_1$: Height of punch when load has been applied (mm)
$L_2$: Height of punch when load has been released (mm)

$$\text{Springback } (\%) = [(L_2-L_1)/(L_1-L_0)] \times 100$$

[2] Average Particle Size

Measured with a particle size analyzer (Nikkiso Co., Ltd.).

[3] Resistivity

Measured based on JIS H0602 (Method for Measuring Resistivity of Silicon Single Crystals and Silicon Wafers Using Four-Point Probe).

[4] Glass Transition Point

Using a thermal analyzer (Q400 TMA, from TA Instruments), measurement was carried out at a temperature rise rate of 1° C./min under a load of 5 g, and the inflection point in the resulting coefficient of thermal expansion curve was treated as the glass transition point.

[5] Strength Tests (Flexural Strength, Flexural Modulus, Flexural Strain)

Using 100×20×2 mm test specimens cut from a separator, three-point bending tests were carried out in accordance with JIS K 6911 ("General Test Methods for Thermosetting Plastics") at a span between the support points of 40 mm, and the flexural strength, flexural modulus and flexural strain were measured.

[6] TOC

The above test specimen was placed in 500 mL of deionized water and heated for 1,000 hours at an internal temperature of 90° C. After the completion of heating, the test specimen was removed and the total organic carbon within the deionized water was measured with a TOC analyzer (TOC-L, from Shimadzu Corporation).

Working Example 1

A resin composition for dense fuel cell separators was prepared by charging a Henschel mixer with 100 parts by weight of Graphite Powder 1 (synthetic graphite, needle; springback, 23%; average particle size (d50), 50 μm), 20.4 parts by weight of Epoxy Resin 1 (an o-cresol-novolak epoxy resin available as EOCN-1020-65 from Nippon Kayaku Co., Ltd.; epoxy equivalent weight, 198 g/eq), 10.7 parts by weight of phenolic resin (a novolak phenolic resin available as Shonol BRG-566 from Aika SDK Phenol Co., Ltd.; hydroxyl equivalent weight, 103 g/eq), and 0.25 part by weight of 2-phenylimidazole (referred to below as 2PZ, from Shikoku Chemicals Corporation), then mixing these ingredients together for 3 minutes at 800 rpm.

The resulting composition was charged into a mold for producing fuel cell separators and compression molded at a mold temperature of 185° C., a molding pressure of 36.6 MPa and a molding time of 9 seconds, thereby giving a dense molded body with dimensions of 240 mm×240 mm×2 mm and having gas flow channels.

Next, a dense fuel cell separator was obtained by subjecting the entire surface of the resulting dense molded body to roughening treatment by wet blasting using alumina abrasive grit (average particle size, d50=6 μm) under the following conditions: discharge pressure, 0.25 MPa; transport speed, 1.5 m/min.

Working Example 2

Aside from changing Graphite Powder 1 to Graphite Powder 2 (synthetic graphite, needle; springback, 30%; average particle size (d50), 50 μm), a composition was prepared and compression molded in the same way as in Working Example 1, giving a dense fuel cell separator.

Working Example 3

Aside from changing Graphite Powder 1 to Graphite Powder 3 (synthetic graphite, needle; springback, 40%; average particle size (d50), 50 μm), a composition was prepared and compression molded in the same way as in Working Example 1, giving a dense fuel cell separator.

Working Example 4

Aside from changing Graphite Powder 1 to Graphite Powder 4 (synthetic graphite, vein; springback, 45%; average particle size (d50), 30 μm), a composition was prepared and compression molded in the same way as in Working Example 1, giving a dense fuel cell separator.

Working Example 5

Aside from changing Graphite Powder 1 to Graphite Powder 5 (synthetic graphite, vein; springback, 50%; average particle size (d50), 50 μm), a composition was prepared and compression molded in the same way as in Working Example 1, giving a dense fuel cell separator.

Working Example 6

Aside from changing Graphite Powder 1 to Graphite Powder 6 (synthetic graphite, vein; springback, 55%; average particle size (d50), 70 μm), a composition was prepared and compression molded in the same way as in Working Example 1, giving a dense fuel cell separator.

Working Example 7

Aside from changing Graphite Powder 1 to Graphite Powder 7 (synthetic graphite, vein; springback, 60%; average particle size (d50), 100 μm), a composition was prepared and compression molded in the same way as in Working Example 1, giving a dense fuel cell separator.

Working Example 8

Aside from changing the 100 parts by weight of Graphite Powder 1 to a combination of 20 parts by weight of Graphite Powder 1 and 80 parts by weight of Graphite Powder 9 (synthetic graphite, vein; springback, 75%; average particle size (d50), 50 μm), a composition was prepared and compression molded in the same way as in Working Example 1, giving a dense fuel cell separator.

Working Example 9

Aside from changing the 100 parts by weight of Graphite Powder 1 to a combination of 30 parts by weight of Graphite Powder 8 (natural graphite, flakes; springback, 10%; average particle size (d50), 50 μm) and 70 parts by weight of Graphite Powder 9, a composition was prepared and compression molded in the same way as in Working Example 1, giving a dense fuel cell separator.

Working Example 10

Aside from changing the 20.4 parts by weight of Epoxy Resin 1 to 19.8 parts by weight of Epoxy Resin 3 (a biphenyl epoxy resin available as jER YX4000 from Mitsubishi Chemical Corporation; epoxy equivalent weight, 183 g/eq) and changing the amount of phenolic resin added to 11.3 parts by weight, a composition was prepared and compression molded in the same way as in Working Example 4, giving a dense fuel cell separator.

Working Example 11

Aside from changing the 20.4 parts by weight of Epoxy Resin 1 to 19.8 parts by weight of Epoxy Resin 3 and changing the amount of phenolic resin added to 11.3 parts by weight, a composition was prepared and compression molded in the same way as in Working Example 5, giving a dense fuel cell separator.

Working Example 12

Aside from changing the 20.4 parts by weight of Epoxy Resin 1 to 19.8 parts by weight of Epoxy Resin 3 and changing the amount of phenolic resin added to 11.3 parts by weight, a composition was prepared and compression molded in the same way as in Working Example 6, giving a dense fuel cell separator.

Working Example 13

Aside from changing the 20.4 parts by weight of Epoxy Resin 1 to 19.8 parts by weight of Epoxy Resin 3 and changing the amount of phenolic resin added to 11.3 parts by weight, a composition was prepared and compression molded in the same way as in Working Example 7, giving a dense fuel cell separator.

Working Example 14

Aside from changing the 20.4 parts by weight of Epoxy Resin 1 to a combination of 10.1 parts by weight of Epoxy Resin 1 and 10.1 parts by weight of Epoxy Resin 3 and changing the amount of phenolic resin added to 11.0 parts by weight, a composition was prepared and compression molded in the same way as in Working Example 5, giving a dense fuel cell separator.

Working Example 15

Aside from changing the 20.4 parts by weight of Epoxy Resin 1 to a combination of 14.4 parts by weight of Epoxy Resin 1 and 6.2 parts by weight of Epoxy Resin, 2 (an o-cresol-novolak epoxy resin available as EOCN-103S from Nippon Kagaktu Co., Ltd.; epoxy equivalent weight, 214 g/eq) and changing the amount of phenolic resin added to 10.6 parts by weight, a composition was prepared and compression molded in the same way as in Working Example 5, giving a dense fuel cell separator.

Working Example 16

Aside from changing the 20.4 parts by weight of Epoxy Resin 1 to a combination of 5.0 parts by weight of Epoxy Resin 2 and 15.1 parts by weight of Epoxy Resin 3 and changing the amount of phenolic resin added to 11.0 parts by weight, a composition was prepared and compression molded in the same way as in Working Example 5, giving a dense fuel cell separator.

Comparative Example 1

Aside from changing Graphite Powder 1 to Graphite Powder 8, a composition was prepared and compression molded in the same way as in Working Example 1, giving a dense fuel cell separator.

Comparative Example 2

Aside from changing Graphite Powder 1 to Graphite Powder 9, a composition was prepared and compression molded in the same way as in Working Example 1, giving a dense fuel cell separator.

Comparative Example 3

Aside from changing Graphite Powder 1 to Graphite Powder 10 (synthetic graphite, vein; springback, 40%; average particles size (d50), 20 μm), a composition was prepared and compression molded in the same way as in Working Example 1, giving a dense fuel cell separator.

Comparative Example 4

Aside from changing Graphite Powder 1 to Graphite Powder 11 (synthetic graphite, vein; springback, 65%; average particles size (d50), 110 μm), a composition was prepared and compression molded in the same way as in Working Example 1, giving a dense fuel cell separator.

Comparative Example 5

Aside from changing Graphite Powder 1 to Graphite Powder 9, 20.4 parts by weight of Epoxy Resin 1 to 19.8 parts by weight of Epoxy Resin 3, and the amount of phenolic resin added to 11.3 parts by weight, a composition was prepared and compression molded in the same way as in Working Example 1, giving a dense fuel cell separator.

Comparative Example 6

Aside from changing Graphite Powder 1 to Graphite Powder 10, 20.4 parts by weight of Epoxy Resin 1 to 19.8 parts by weight of Epoxy Resin 3, and the amount of phenolic resin added to 11.3 parts by weight, a composition was prepared and compression molded in the same way as in Working Example 1, giving a dense fuel cell separator.

Comparative Example 7

Aside from changing Graphite Powder 1 to Graphite Powder 11, 20.4 parts by weight of Epoxy Resin 1 to 19.8 parts by weight of Epoxy Resin 3, and the amount of phenolic resin added to 11.3 parts by weight, a composition was prepared and compression molded in the same way as in Working Example 1, giving a dense fuel cell separator.

The resistivity, glass transition point, flexural strength, flexural modulus, flexural strain and TOC were measured for each of the dense fuel cell separators obtained in Working Examples 1 to 16 and Comparative Examples 1 to 7. The results are shown in Tables 1 and 2. In the tables, "parts" signifies parts by weight.

TABLE 1

| | | | \multicolumn{9}{c|}{Working Example} |
|---|---|---|---|---|---|---|---|---|---|---|---|
| | | | 1 | 2 | 3 | 4 | 5 | 6 | 7 | 8 | 9 |
| Graphite powder | Amount added (parts) | Graphite 1 | 100 | — | — | — | — | — | — | 20 | — |
| | | Graphite 2 | — | 100 | — | — | — | — | — | — | — |
| | | Graphite 3 | — | — | 100 | — | — | — | — | — | — |
| | | Graphite 4 | — | — | — | 100 | — | — | — | — | — |
| | | Graphite 5 | — | — | — | — | 100 | — | — | — | — |
| | | Graphite 6 | — | — | — | — | — | 100 | — | — | — |
| | | Graphite 7 | — | — | — | — | — | — | 100 | — | — |
| | | Graphite 8 | — | — | — | — | — | — | — | — | 30 |
| | | Graphite 9 | — | — | — | — | — | — | — | 80 | 70 |
| | | Graphite 10 | — | — | — | — | — | — | — | — | — |
| | | Graphite 11 | — | — | — | — | — | — | — | — | — |
| | Springback (%) | | 23 | 30 | 40 | 45 | 50 | 55 | 60 | 65 | 62 |
| | Average particle size (d50) (μm) | | 50 | 50 | 50 | 30 | 50 | 70 | 100 | 50 | 50 |
| Base resin | Amount added (parts) | Epoxy Resin 1 | 20.4 | 20.4 | 20.4 | 20.4 | 20.4 | 20.4 | 20.4 | 20.4 | 20.4 |
| | | Epoxy Resin 2 | — | — | — | — | — | — | — | — | — |
| | | Epoxy Resin 3 | — | — | — | — | — | — | — | — | — |
| | Epoxy equivalent weight (g/eq) | | 198 | 198 | 198 | 198 | 198 | 198 | 198 | 198 | 198 |
| Curing agent | Amount added (parts) | | 10.7 | 10.7 | 10.7 | 10.7 | 10.7 | 10.7 | 10.7 | 10.7 | 10.7 |
| | Hydroxyl equivalent weight (g/eq) | | 103 | 103 | 103 | 103 | 103 | 103 | 103 | 103 | 103 |
| | Ratio w/r epoxy equivalent weight | | 1.01 | 1.01 | 1.01 | 1.01 | 1.01 | 1.01 | 1.01 | 1.01 | 1.01 |
| Curing accelerator (2PZ), amount added (parts) | | | 0.25 | 0.25 | 0.25 | 0.25 | 0.25 | 0.25 | 0.25 | 0.25 | 0.25 |
| Internal mold release agent, amount added (parts) | | | 0.2 | 0.2 | 0.2 | 0.2 | 0.2 | 0.2 | 0.2 | 0.2 | 0.2 |
| Resistivity (mΩ·cm) | | | 11.4 | 11.2 | 10.8 | 13.5 | 11.6 | 10.5 | 8.8 | 14.8 | 14.3 |
| Glass transition point (Tg) (°C) | | | 167 | 167 | 165 | 165 | 165 | 165 | 164 | 161 | 161 |
| Flexural strength (MPa) | | | 58.4 | 57.6 | 55.5 | 65.2 | 63.2 | 60.4 | 52 | 57.9 | 55.4 |
| Flexural modulus (GPa) | | | 13.5 | 13.1 | 12.2 | 11.8 | 11.1 | 10.4 | 9.6 | 9.8 | 10.7 |
| Flexural strain (%) | | | 0.49 | 0.51 | 0.55 | 0.63 | 0.66 | 0.63 | 0.65 | 0.72 | 0.67 |
| Total organic carbon (TOC) (ppm) | | | 5.4 | 5.8 | 5.7 | 5.6 | 5.8 | 5.5 | 5.3 | 6.3 | 6.1 |

| | | | \multicolumn{7}{c|}{Working Example} |
|---|---|---|---|---|---|---|---|---|---|
| | | | 10 | 11 | 12 | 13 | 14 | 15 | 16 |
| Graphite powder | Amount added (parts) | Graphite 1 | — | — | — | — | — | — | — |
| | | Graphite 2 | — | — | — | — | — | — | — |
| | | Graphite 3 | — | — | — | — | — | — | — |
| | | Graphite 4 | 100 | — | — | — | — | — | — |
| | | Graphite 5 | — | 100 | — | — | 100 | 100 | 100 |
| | | Graphite 6 | — | — | 100 | — | — | — | — |
| | | Graphite 7 | — | — | — | 100 | — | — | — |
| | | Graphite 8 | — | — | — | — | — | — | — |
| | | Graphite 9 | — | — | — | — | — | — | — |
| | | Graphite 10 | — | — | — | — | — | — | — |
| | | Graphite 11 | — | — | — | — | — | — | — |
| | Springback (%) | | 45 | 50 | 55 | 60 | 50 | 50 | 50 |
| | Average particle size (d50) (μm) | | 50 | 50 | 70 | 100 | 50 | 50 | 50 |
| Base resin | Amount added (parts) | Epoxy Resin 1 | — | — | — | — | 10.1 | 14.4 | — |
| | | Epoxy Resin 2 | — | — | — | — | — | 6.2 | 5.0 |
| | | Epoxy Resin 3 | 19.8 | 19.8 | 19.8 | 19.8 | 10.1 | — | 15.1 |
| | Epoxy equivalent weight (g/eq) | | 183 | 183 | 183 | 183 | 191 | 203 | 191 |
| Curing agent | Amount added (parts) | | 11.3 | 11.3 | 11.3 | 11.3 | 11.0 | 10.6 | 11.0 |
| | Hydroxyl equivalent weight (g/eq) | | 103 | 103 | 103 | 103 | 103 | 103 | 103 |
| | Ratio w/r epoxy equivalent weight | | 1.01 | 1.01 | 1.01 | 1.01 | 1.01 | 1.02 | 1.01 |
| Curing accelerator (2PZ), amount added (parts) | | | 0.25 | 0.25 | 0.25 | 0.25 | 0.25 | 0.25 | 0.25 |
| Internal mold release agent, amount added (parts) | | | 0.2 | 0.2 | 0.2 | 0.2 | 0.2 | 0.2 | 0.2 |
| Resistivity (mΩ·cm) | | | 14.4 | 12.1 | 11.1 | 9.3 | 11.5 | 13.9 | 14.1 |
| Glass transition point (Tg) (°C) | | | 143 | 141 | 140 | 140 | 153 | 152 | 137 |
| Flexural strength (MPa) | | | 63.2 | 61.6 | 58.9 | 51.2 | 62.5 | 58.9 | 58.4 |
| Flexural modulus (GPa) | | | 12.5 | 11.8 | 11.1 | 10.2 | 11.4 | 10.9 | 11.3 |
| Flexural strain (%) | | | 0.61 | 0.64 | 0.62 | 0.63 | 0.66 | 0.6 | 0.59 |
| Total organic carbon (TOC) (ppm) | | | 5.7 | 5.8 | 5.6 | 5.4 | 5.6 | 6.4 | 6.2 |

TABLE 2

|  |  |  | Comparative Example |  |  |  |  |  |  |
|---|---|---|---|---|---|---|---|---|---|
|  |  |  | 1 | 2 | 3 | 4 | 5 | 6 | 7 |
| Graphite powder | Amount added (parts) | Graphite 1 | — | — | — | — | — | — | — |
|  |  | Graphite 2 | — | — | — | — | — | — | — |
|  |  | Graphite 3 | — | — | — | — | — | — | — |
|  |  | Graphite 4 | — | — | — | — | — | — | — |
|  |  | Graphite 5 | — | — | — | — | — | — | — |
|  |  | Graphite 6 | — | — | — | — | — | — | — |
|  |  | Graphite 7 | — | — | — | — | — | — | — |
|  |  | Graphite 8 | 100 | — | — | — | — | — | — |
|  |  | Graphite 9 | — | 100 | — | — | 100 | — | — |
|  |  | Graphite 10 | — | — | 100 | — | — | 100 | — |
|  |  | Graphite 11 | — | — | — | 100 | — | — | 100 |
|  | Springback (%) |  | 10 | 75 | 40 | 65 | 75 | 40 | 65 |
|  | Average particle size (d50) (μm) |  | 50 | 50 | 20 | 110 | 50 | 20 | 110 |
| Base resin | Amount added (parts) | Epoxy Resin 1 | 20.4 | 20.4 | 20.4 | 20.4 | — | — | — |
|  |  | Epoxy Resin 2 | — | — | — | — | — | — | — |
|  |  | Epoxy Resin 3 | — | — | — | — | 19.8 | 19.8 | 19.8 |
|  | Epoxy equivalent weight (g/eq) |  | 198 | 198 | 198 | 198 | 183 | 183 | 183 |
| Curing agent | Amount added (parts) |  | 10.7 | 10.7 | 10.7 | 10.7 | 11.3 | 11.3 | 11.3 |
|  | Hydroxyl equivalent weight (g/eq) |  | 103 | 103 | 103 | 103 | 103 | 103 | 103 |
|  | Ratio w/r epoxy equivalent weight |  | 1.01 | 1.01 | 1.01 | 1.01 | 1.01 | 1.01 | 1.01 |
| Curing accelerator (2PZ), amount added (parts) |  |  | 0.25 | 0.25 | 0.25 | 0.25 | 0.25 | 0.25 | 0.25 |
| Internal mold release agent, amount added (parts) |  |  | 0.2 | 0.2 | 0.2 | 0.2 | 0.2 | 0.2 | 0.2 |
| Resistivity (mΩ · cm) |  |  | 11 | 15.6 | 16.3 | 8.5 | 16.1 | 16.9 | 8.7 |
| Glass transition point (Tg) (° C.) |  |  | 167 | 125 | 165 | 163 | 112 | 144 | 138 |
| Flexural strength (MPa) |  |  | 48.3 | 58.9 | 67.8 | 49.2 | 56.8 | 65.7 | 48.3 |
| Flexural modulus (GPa) |  |  | 15.1 | 8.9 | 12.2 | 9.5 | 9.46 | 13.1 | 10.1 |
| Flexural strain (%) |  |  | 0.42 | 0.78 | 0.61 | 0.64 | 0.75 | 0.59 | 0.62 |
| Total organic carbon (TOC) (ppm) |  |  | 4.9 | 7.2 | 5.2 | 5.5 | 7.4 | 5.2 | 5.6 |

As shown in Tables 1 and 2, the separators in Working Examples 1 to 16 obtained from compositions in which the springback and average particle size of the graphite fall within the ranges stipulated in this invention had resistivities of not more than 15 mΩ-cm, glass transition points of at least 135° C., flexural strengths of at least 50 MPa, flexural moduli of at least 9.5 GPa, and TOC levels of not more than 7 ppm, and thus exhibited values that are suitable for dense fuel cell separators.

The separators in Comparative Examples 1 to 7 were obtained using compositions in which the springback or the average particle size of the graphite falls outside the range stipulated in this invention, as a result of which the resistivity, strength or both were found to be inadequate.

Specifically, in Comparative Example 1, because the springback of the graphite powder was too low, curing of the resin appears to have ended (glass transition point, 167° C.), but the flexural strength was low.

In Comparative Examples 2 and 5, because the springback of the graphite powder was too high, curing of the resin did not end in the molding time of 9 seconds (glass transition point, 125° C.), and the resistivity and TOC were high.

In Comparative Examples 3 and 6, because the particle size of the graphite powder was too small, curing of the resin appears to have ended, but resistivity was high.

In Comparative Examples 4 and 7, because the particle size of the graphite powder was ton large, curing of the resin appears to have ended, but the flexural strength was low.

Working Example 17

Aside from changing the curing accelerator from 2PZ to 2-phenyl-4-methylimidazole (referred to below as 2P4MZ, from Shikoku Chemicals Corporation), a composition was prepared and compression molded in the same way as in Working Example 5, giving a dense fuel cell separator.

Working Example 18

Aside from changing the curing accelerator from 0.25 part by weight of 2PZ to a combination of 0.125 part by weight of 2PZ and 0.125 part by weight of 2P4MZ, a composition was prepared and compression molded in the same way as in Working Example 5, giving a dense fuel cell separator.

Working Example 19

Aside from changing the curing accelerator from 0.25 part by weight of 2PZ to a combination of 0.075 part by weight of 2PZ and 0.175 part by weight of 2P4MZ, a composition was prepared and compression molded in the same way as in Working Example 5, giving a dense fuel cell separator.

Working Example 20

Aside from changing the curing accelerator from 0.25 part by weight of 2PZ to a combination of 0.175 part by weight of 2PZ and 0.075 part by weight of 2P4MZ, a composition was prepared and compression molded in the same way as in Working Example 5, giving a dense fuel cell separator.

Comparative Example 8

Aside from changing the curing accelerator from 2PZ to 2-ethyl-4-methylimidazole (referred to below as 2E4MZ, from Shikoku Chemicals Corporation), a composition was prepared and compression molded in the same way as in Working Example 5, giving a dense fuel cell separator.

Comparative Example 9

Aside from changing the curing accelerator from 2PZ to 2-methylimidazole (referred to below as 2MZ, from Shikoku Chemicals Corporation), a composition was prepared and compression molded in the same way as in Working Example 5, giving a dense fuel cell separator.

Comparative Example 10

Aside from changing the curing accelerator from 2PZ to 2-undecylimidazole (referred to below as C11Z, from Shikoku Chemicals Corporation), a composition was prepared and compression molded in the same way as in Working Example 5, giving a dense fuel cell separator.

Comparative Example 11

Aside from changing the curing accelerator from 2PZ to 2-heptadecylimidazole (referred to below as C17Z, from Shikoku Chemicals Corporation), a composition was prepared and compression molded in the same way as in Working Example 5, giving a dense fuel cell separator.

Comparative Example 12

Aside from changing the curing accelerator from 2PZ to triphenylphosphine (referred to below as TPP), a composition was prepared and compression molded in the same way as in Working Example 5, giving a dense fuel cell separator.

The resistivity, glass transition point, flexural strength, flexural modulus, flexural strain and TOC were measured for each of the dense fuel cell separators obtained in Working Examples 17 to 20 and Comparative Examples 8 to 12. The results are shown in Table 3. In the table, "parts" signifies parts by weight.

mΩ·cm, glass transition points higher than 160° C., flexural strengths above 60 MPa, flexural moduli of 11 GPa or more, and TOC levels below 7 ppm, and thus exhibited values that are suitable for dense fuel cell separators.

The separators in Comparative Examples 8 to 12 used as the curing accelerator either an imidazole compound that does not have a phenyl group at the 2 position or triphenylphosphine, and therefore had a high resistivity and a low strength.

Specifically, in Comparative Examples 8 and 9, because the activity of the curing accelerator was too high, a rise in viscosity occurred due to rapid curing reactions within the mold, resulting in molding defects and a high resistivity.

In Comparative Examples 10 to 12, because the activity of the curing accelerator was too low, molding was not finished at 9 seconds, the glass transition point was low, the resistivity and TOC level were high, and the flexural strength was low.

Working Examples 21 and 22, and Comparative Examples 13 and 14

Aside from using the resin compositions prepared in Working Example 1, Working Example 5, Comparative Example 1 and Comparative Example 2, and variously setting the compression time to 3, 5, 7, 12, 15, 20 and 30 seconds, dense fuel cell separators were produced in the same way as in Working Example 1.

The resistivities, flexural strengths and TOC levels for each of the resulting separators were measured.

TABLE 3

| | | | Working Example | | | | Comparative Example | | | | |
|---|---|---|---|---|---|---|---|---|---|---|---|
| | | | 17 | 18 | 19 | 20 | 8 | 9 | 10 | 11 | 12 |
| Graphite powder | Amount added (parts) | Graphite 5 | 100 | 100 | 100 | 100 | 100 | 100 | 100 | 100 | 100 |
| | Springback (%) | | 50 | 50 | 50 | 50 | 50 | 50 | 50 | 50 | 50 |
| | Average particle size (d50) (μm) | | 50 | 50 | 50 | 50 | 50 | 50 | 50 | 50 | 50 |
| Base resin | Amount added (parts) | Epoxy Resin 1 | 20.4 | 20.4 | 20.4 | 20.4 | 20.4 | 20.4 | 20.4 | 20.4 | 20.4 |
| | Epoxy equivalent weight (g/eq) | | 198 | 198 | 198 | 198 | 198 | 198 | 198 | 198 | 198 |
| Curing agent | Amount added (parts) | | 10.7 | 10.7 | 10.7 | 10.7 | 10.7 | 10.7 | 10.7 | 10.7 | 10.7 |
| | Hydroxyl equivalent weight (g/eq) | | 103 | 103 | 103 | 103 | 103 | 103 | 103 | 103 | 103 |
| | Ratio w/r epoxy equivalent weight | | 1.01 | 1.01 | 1.01 | 1.01 | 1.01 | 1.01 | 1.01 | 1.01 | 1.01 |
| Curing accelerator | Amount added (parts) | 2PZ | — | 0.125 | 0.075 | 0.175 | — | — | — | — | — |
| | | 2P4MZ | 0.250 | 0.125 | 0.175 | 0.075 | — | — | — | — | — |
| | | 2E4MZ | — | — | — | — | 0.250 | — | — | — | — |
| | | 2MZ | — | — | — | — | — | 0.250 | — | — | — |
| | | C11Z | — | — | — | — | — | — | 0.250 | — | — |
| | | C15Z | — | — | — | — | — | — | — | 0.250 | — |
| | | TPP | — | — | — | — | — | — | — | — | 0.250 |
| Internal mold release agent, amount added (parts) | | | 0.2 | 0.2 | 0.2 | 0.2 | 0.2 | 0.2 | 0.2 | 0.2 | 0.2 |
| Resistivity (mΩ · cm) | | | 12.1 | 11.8 | 11.8 | 12.1 | 15.3 | 18.2 | 24.5 | 28.9 | 22.1 |
| Glass transition point (Tg) (° C.) | | | 167 | 165 | 166 | 166 | 158 | 154 | 126 | 122 | 106 |
| Flexural strength (MPa) | | | 62.4 | 62.1 | 61.3 | 63.1 | 56.4 | 512 | 44.6 | 36.9 | 46.6 |
| Flexural modulus (GPa) | | | 11.2 | 11.2 | 11 | 11.3 | 10 | 9.8 | 9.1 | 8.1 | 9.2 |
| Flexural strain (%) | | | 0.65 | 0.65 | 0.63 | 0.65 | 0.63 | 0.62 | 0.44 | 0.36 | 0.45 |
| Total organic carbon (TOC) (ppm) | | | 5.9 | 5.8 | 5.7 | 5.8 | 6.6 | 6.8 | 9 | 7.2 | 7.1 |

As shown in Table 3, the separators in Working Examples 17 to 20 obtained from compositions containing an imidazole compound having a phenyl group at the 2 position as the curing accelerator had resistivities lower than 13

Figure 2:
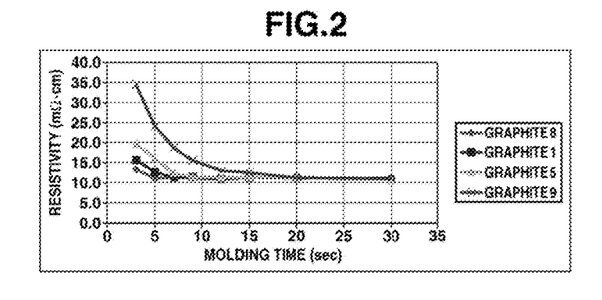
FIG. 2 is a graph showing the relationship between molding time and resistivity for the separators produced in Working Examples 21 and 22 and Comparative Examples 13 and 14.
Figure 3:
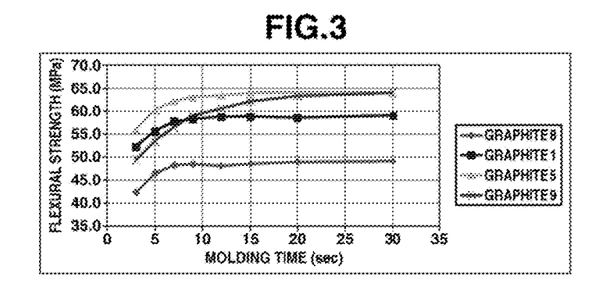
FIG. 3 is a graph showing the relationship between molding time and flexural strength for the separators produced in Working Examples 21 and 22 and Comparative Examples 13 and 14.
Figure 4:
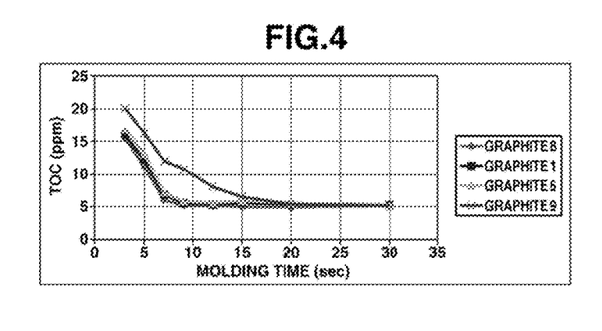
FIG. 4 is a graph showing the relationship between molding time and TOC for the separators produced in Working Examples 21 and 22 and Comparative Examples 13 and 14.

The results are shown in Tables 4 to 6. The results from Working Examples 1 and 5 and Comparative Examples 1 and 2 (molding time, 9 seconds) are presented together in each of the tables. These results are also shown in FIGS. 2 to 4.

TABLE 4

| | Graphite powder | Springback (%) | Molding time (seconds) | | | | | | | |
|---|---|---|---|---|---|---|---|---|---|---|
| | | | 3 | 5 | 7 | 9 | 12 | 15 | 20 | 30 |
| Resistivity (mΩ · cm) | Graphite 8 | 10 | 13.4 | 11.0 | 11.2 | 11.0 | 10.9 | 11.2 | 11.1 | 11.0 |
| | Graphite 1 | 23 | 15.6 | 12.4 | 11.2 | 11.4 | 10.8 | 11.2 | 11.0 | 11.0 |
| | Graphite 5 | 50 | 19.8 | 16.1 | 12.4 | 11.6 | 11.4 | 11.4 | 11.0 | 10.9 |
| | Graphite 9 | 75 | 34.6 | 24.2 | 18.7 | 15.6 | 13.1 | 12.5 | 11.4 | 11.0 |

TABLE 5

| | Graphite powder | Springback (%) | Molding time (seconds) | | | | | | | |
|---|---|---|---|---|---|---|---|---|---|---|
| | | | 3 | 5 | 7 | 9 | 12 | 15 | 20 | 30 |
| Flexural strength (mPa) | Graphite 8 | 10 | 42.4 | 46.6 | 48.4 | 48.6 | 48.2 | 48.6 | 48.9 | 49.2 |
| | Graphite 1 | 23 | 52.3 | 55.6 | 57.8 | 58.4 | 58.8 | 58.8 | 58.6 | 59.0 |
| | Graphite 5 | 50 | 56.1 | 60.2 | 62.3 | 63.1 | 63.6 | 64.1 | 64.0 | 64.0 |
| | Graphite 9 | 75 | 49.4 | 53.4 | 56.4 | 58.9 | 60.7 | 62.2 | 63.4 | 64.1 |

TABLE 6

| | Graphite powder | Springback (%) | Molding time (seconds) | | | | | | | |
|---|---|---|---|---|---|---|---|---|---|---|
| | | | 3 | 5 | 7 | 9 | 12 | 15 | 20 | 30 |
| TOC (ppm) | Graphite 8 | 10 | 15.6 | 11.3 | 6.1 | 5.4 | 5.2 | 5.1 | 5 | 5.1 |
| | Graphite 1 | 23 | 16.2 | 12.3 | 6.9 | 5.6 | 5.4 | 5.6 | 5.4 | 5.3 |
| | Graphite 5 | 50 | 16.9 | 13.1 | 7.2 | 5.8 | 5.6 | 5.9 | 5.6 | 5.2 |
| | Graphite 9 | 75 | 20.1 | 16.3 | 12.1 | 10.9 | 8.1 | 6.6 | 5.4 | 5.1 |

As shown in Tables 4 to 6 and FIGS. 2 to 4, it is apparent that when resin compositions containing Graphite Powder 8 having a springback of 10% were used, the flexural strength was inadequate at molding times of less than 10 seconds.

Also, when resin compositions containing Graphite Powder 9 having a springback of 75% were used, the resistivity and TOC level were high at molding times of less than 10 seconds.

By contrast, when resin compositions containing Graphite Powders 1 and 5 having springbacks of respectively 23% and 50% were used, separators in which the resistivity, flexural strength and TOC level were all good were obtained even at molding times of less than 10 seconds.

The above results demonstrate that, in order to obtain dense fuel cell separators having good characteristics when molded for a short time, it is preferable to use graphite powders having a springback of between 20% and 70%.

The invention claimed is:

1. A dense fuel cell separator which is obtained by molding a resin composition for dense fuel cell separators, the resin composition comprising graphite powder and an epoxy resin component that includes a base resin, a curing agent and a curing accelerator,
   wherein the dense fuel cell separator has a total organic carbon(TOC) value of 7 ppm or less,
   wherein the graphite powder has a springback of between 20 and 70% and an average particle size d50 of from 30 to 100 μm, and
   wherein the curing accelerator is an imidazole compound having an aryl group at position 2.

2. The dense fuel cell separators of claim 1, wherein the springback is between 20 and 65%.

3. The dense fuel cell separators of claim 1, wherein the base resin is at least one resin selected from the group consisting of cresol-novolak epoxy resins and biphenyl epoxy resins.

4. The dense fuel cell separators of claim 1, wherein the curing agent is a novolak phenolic resin.

5. The dense fuel cell separators of claim 1, wherein the curing accelerator is an imidazole compound having a phenyl group position 2.

6. The dense fuel cell separator of claim 1, wherein the dense fuel cell separator has a resistivity of not more than 15 mΩ, a glass transition temperature of at least 135° C. and a flexural strength of at least 50 MPa.

7. A method for producing the dense fuel cell separator of claim 1, comprising the step of compression molding the resin composition for dense fuel cell separators.

8. The method of claim 7, wherein compression molding is carried out for a period of less than 10 seconds.

* * * * *